United States Patent

Hatai et al.

Patent Number: 5,110,274
Date of Patent: May 5, 1992

[54] METALLIC MOLD FOR COGGED V-BELT

[75] Inventors: Hirotaka Hatai; Akira Mayahara, both of Kobe, Japan

[73] Assignee: Bando Chemical Industries, Ltd., Kobe, Japan

[21] Appl. No.: 621,426

[22] Filed: Dec. 5, 1990

[30] Foreign Application Priority Data

Dec. 7, 1989 [JP] Japan ................... 1-141836

[51] Int. Cl.⁵ .............................................. B29C 35/02
[52] U.S. Cl. ........................... 425/28.100; 425/34.100; 425/384
[58] Field of Search ............ 425/384, 28.1, 34.1, 425/34.2, 34.3

[56] References Cited

U.S. PATENT DOCUMENTS

| | | | |
|---|---|---|---|
| 1,391,805 | 9/1921 | Subers | 425/28.1 |
| 2,327,566 | 8/1943 | Slusher | 425/34.2 |
| 2,602,188 | 7/1952 | Gorecki | 425/28.1 |
| 2,867,845 | 1/1959 | Sauer | 425/34.2 |

Primary Examiner—Jay H. Woo
Assistant Examiner—J. F. Durkin
Attorney, Agent, or Firm—Wenderoth, Lind & Ponack

[57] ABSTRACT

A metallic mold for vulcanizing molding of cogged V-belt with unvulcanized belt material, including a lower mold having a gentle back curve in lengthwise direction thereof and an upper mold having a cogged surface with cog peak parts and cog trough parts arranged alternately. The upper mold is so designed that cog peak parts in the specific range at both end portions thereof are narrower than those at the other part but both are the same in height in lengthwise direction.

14 Claims, 1 Drawing Sheet

METALLIC MOLD FOR COGGED V-BELT

BACKGROUND OF THE INVENTION

1. Field of the Invention

This invention relates to a metallic mold for vulcanizing molding of a cogged V-belt of a raw edge type of a long length, particularly to an upper mold having a cogged surface with alternations of cog peaks and cog troughs.

2. Description of the Prior Art

In the vulcanizing molding of cogged V-belts of the raw edge type of a long length, a press vulcanizer using press metallic molds of a plate shape has been generally adopted. This press vulcanizer comprises a pair of pulleys adjustable in distance between the axes of the opposed pulleys and a press vulcanizing machine having an upper board (for surface side of belt), an intermediate board (for bottom side of belt) and a lower board (for downward surface side of belt), with a metallic mold of a plate shape on the belt support surface of each board. An unvulcanized belt material is wound round between a pair of pulleys and is moved in regular order for vulcanizing molding one part by one part.

When press vulcanizing molding is carried out by using a press metallic mold of a plate shape, it has been experienced that at the initial stage of vulcanization, rubber which is yet in semi-vulcanized state, namely, semi-vulcanized rubber near an end portion of the metallic mold flows out toward unvulcanized belt material positioned near the outside of the metallic mold, and as a result unvulcanized belt material positioned near the outside of the metallic mold is deformed and swelled into a bump shape, prior to vulcanizing molding, by being pressed by the flowing semi-vulcanized rubber.

If such a swelled part in a bump shape is vulcanizing molded as it is, with the arrangement of tension cords in disorder, an irregularity is caused in the thickness and width of the belt, and also in the cog shape. This poses a problem with respect to the quality of the cogged belt.

In view of the above demerits, it has been suggested by the Japanese Utility Model Registration Application Publication No. 1-23783, for example, to form a taper extending in such a fashion that it intersects perpendicularly the lengthwise direction at the edge part of the undersurface of both end portions (front end portion and rear end portion) of an upper board having a flat surface of a press metallic mold of a plate shape.

According to the above suggestion, a "taper escape" is provided at the back surface part of the belt, and therefore the incidence of extreme difference in level at the belt surface and irregularity of arrangement of tension cords and belt width will be small. However, a part of the rubber which forms cogs will flow toward the back part side of the belt, and as a result rubber for bonding tension cords (so-called insulation rubber) also presents a flowing phenomenon and is put in a bending state. This has a bad influence upon the adhesion between rubber and cords.

The volume of rubber required for forming a belt material must be the same as or larger than that of a finished belt (in the shape of a cavity of regular metallic mold), otherwise a finished belt of good quality cannot be obtained. If the volume of rubber for forming a belt material is less than that of a finished belt, the problem of "pinhole", "separation" or the like will be raised. Moreover, it is difficult to manufacture a belt material with rubber of the same volume as that of a finished belt. Thus, in manufacturing a belt material it is usual to use rubber of the volume which is larger than that of a finished belt, and accordingly it is unavoidable that a flowing phenomenon of rubber takes place.

SUMMARY OF THE INVENTION

The present invention has for its object to provide a metallic mold to be used for vulcanizing molding of a cogged V-belt of a raw edge type which prevents the flowing out of rubber in a semi-vulcanized state and restricts the disorder of the tension cord arrangement and irregularity of the cog shape.

In order to attain the above object, the present invention comprises the process of preliminarily molding unvulcanized belt material into a semi-vulcanized belt with a cog shape and less fluidity, and then molding it into a regular cogged V-belt.

Concretely, the present invention provides a metallic mold for vulcanizing molding of a cogged V-belt with unvulcanized belt material, having a flat lower mold with a gentle back curve in a lengthwise direction thereof and an upper mold with a cogged surface with cog peak parts and cog trough parts arranged alternately in the lengthwise direction thereof, wherein the upper mold is so designed that cog peak parts in a specific range at both end portions thereof are narrower than those at the other part, but both are the same in height in the lengthwise direction of belt.

It is desirable that the cog peak parts at the part in the specific range at both end portions are smaller than those at the other part by 20–30% in the percentage of volume and by 0.2–0.5 mm in thickness of one side in measurement.

According to the present invention, by devising the shape of the cog peak parts of the upper mold corresponding to the part of semi-vulcanized rubber, it is intended to preliminarily form a cog shape of a semi-vulcanized belt material with less fluidity, and then to carry out vulcanizing molding of the cog shape. Therefore, the flow of rubber of the belt material in the semi-vulcanized state can be prevented and disorder of the arrangement of the tension cords and irregularity in the cog shape can be restricted.

The metallic mold according to the present invention further comprises a cooling means which cools unvulcanized belt material in the vulcanizing process for preventing the flow of the rubber in the semi-vulcanized state and the generation of "sponge rubber" of the belt material in semi-vulcanized state. Furthermore, in the present invention a heat-insulating material is embedded in the upper mold at a position slightly toward the central part of the mold from the cooling means for intercepting heat conduction between the central part, where regular vulcanization is carried out, and the end portion, where rubber is still in the semi-vulcanized state. In this case, therefore, the above-mentioned "specific range" in which the cog peak parts are molded narrower than those at the central part, but both are the same in height, is the range from the end face of the upper mold to the part where the heat-insulating material is provided.

In order to enhance the cooling effect and heat-insulating effect, the lower mold is also provided with a cooling means and a heat-insulating material corresponding to those in the upper mold.

The above and other objects and novel features of the present invention will be made more clear by reading the following description with reference to the accompanying drawings.

BRIEF DESCRIPTION OF THE DRAWINGS

The accompanying drawings show a preferred embodiment the present invention, in which.

DETAILED DESCRIPTION OF THE INVENTION

A description is made below of a preferred embodiment of the present invention, with reference to the accompanying drawings.

Figure 1:
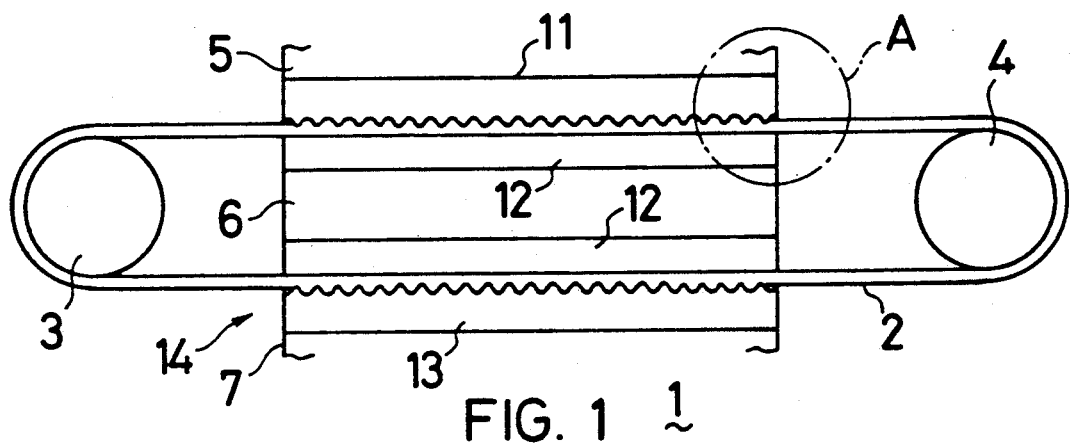
FIG. 1 shows an overall construction of a belt vulcanizer.

In FIG. 1 showing a rough composition of a belt vulcanizer, reference numeral 1 designates a belt vulcanizer for vulcanizing molding of an unvulcanized V-belt material 2 of a raw edge type of a long length. The unvulcanized V-belt material 2 is wound round between a pair of pulleys 3 and 4 (adjustable in the distance between the axes of the opposed pulleys) and is moved in regular order for vulcanizing molding one part by one part by a press vulcanizing machine 14 having an upper board 5 (on the upper surface side of the belt material 2), an intermediate board 6 (on the bottom surface side of the belt material 2) and a lower board 7 (on the lower surface side of the belt material 2), with metallic molds of plate shapes 11, 12, 12, and 13 for vulcanizing molding of a cogged V-belt on belt support surface of the boards 5, 6 and 7.

Figure 2:
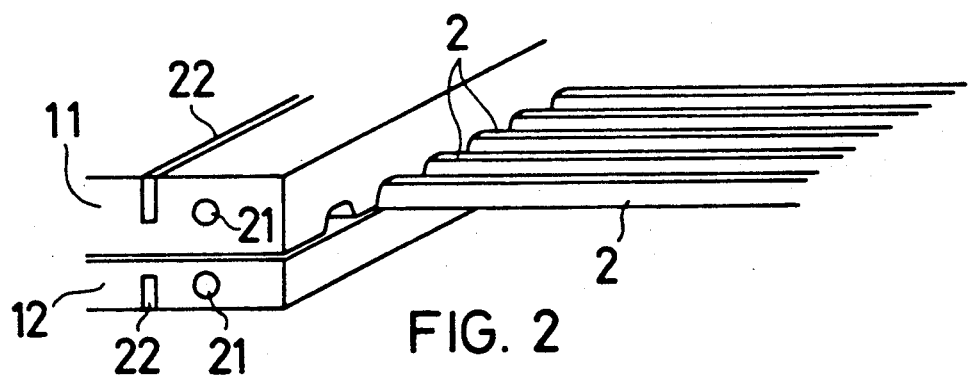
FIG. 2 is a detailed perspective view of part A (encircled) in FIG. 1.

In the above metallic board 11, 12, 12 and 13, a cooling water supply pipe 21 as a cooling means is embedded in the metallic mold along the width direction thereof (illustrated only with respect to the metallic molds 11 and 12) as shown in FIG. 2, whereby the flow of rubber from the belt material 2 in a semi-vulcanized state toward the outside of the metallic mold and the generation of sponge in the belt material 2 in a semi-vulcanized state can be prevented. In addition to the cooling water supply pipe 21, a heat-insulating material 22 comprising a so-called FRP is embedded in the metallic molds 11, 12, 12 and 13, at a point slightly toward the central part from the supply pipe 21. The cooling water supply pipe 21 and the heat-insulating material 22 are arranged correspondingly at each metallic mold 11, 12, 12, 13.

Figures 3, 4:
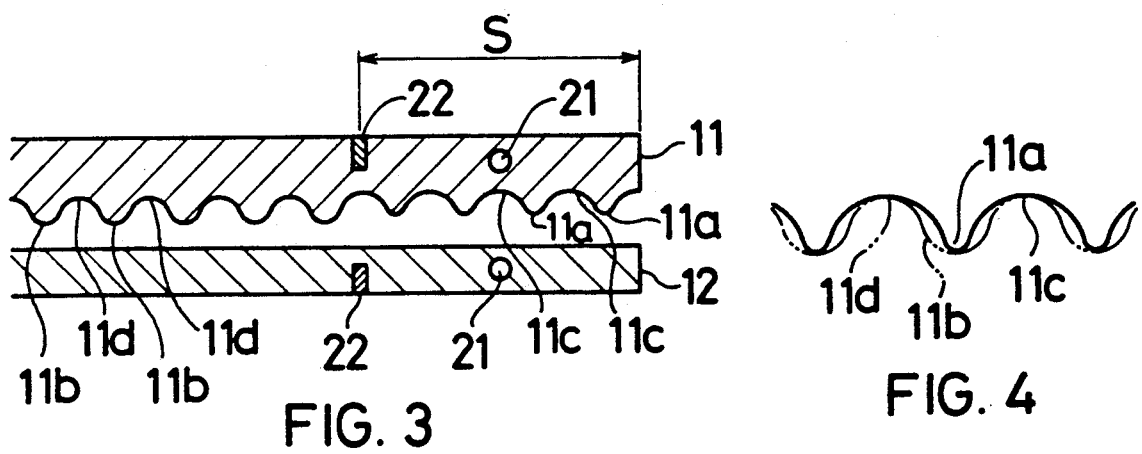
FIG. 3 is a cross section of a main part on an enlarged scale.
FIG. 4 is an explanatory drawing of the shape of a cog peak part.

As shown in FIG. 3, the metallic mold 11 is an upper mold having a cogged surface in a lengthwise direction (with cog peaks 11a and cog troughs 11c, cog peaks 11b and cog troughs 11d arranged alternately) and the metallic mold 12 is a flat lower mold having a gentle back curve in lengthwise direction.

In the cogged surface of the metallic mold 11, the cog peak part 11a at a semi-vulcanizing part S (generally 60 mm–70 mm) of the metallic mold 11 in the lengthwise direction (from the end face of the metallic mold 11 to the point where the heat-insulating material 22 is embedded) is smaller in the percentage of volume than the cog peak part 11b at the other part (vulcanizing part at the central part of metallic mold) by 20–30% (in measurement, smaller by 0.2–0.5 mm in the thickness of one side), but both are the same in height, namely, the volume of the cog trough part 11c (space part) in the specific range is a little larger than that of the cog trough part 11d at the other part (refer to FIG. 4). The cog peak part 11a is symmetrical to the center line extending in the height direction and the cog pitch is constant in lengthwise direction.

Although not shown concretely in the drawing, the metallic mold 13 is similar to the metallic mold 11 and is an upper mold having a cogged surface with cog peak parts and cog trough parts of the specified shape, alternately.

With the above composition, at the initial stage of vulcanization, the unvulcanized belt material 2 is preliminarily molded into a semi-vulcanized state at an end portion of the metallic molds 11, 12, 12 and 13, namely, at the semi-vulcanizing part S, without being bent and in a substantially straight line state (fluidity of the semi-vulcanized rubber of the belt material 2 is somewhat suppressed). Then, the rubber part in a semi-vulcanized state is vulcanized and molded into a regular cog shape (so-called regular vulcanization). Thus, the part of the belt material 2 which is in a semi-vulcanized state is vulcanized and molded into a regular shape, free from the generation of "pinhole" and the like. Since fluidity of the rubber is suppressed by preliminary molding, even in the case where the cogged V-belt is molded by using rubber containing short fibers, the cogged V-belt can be vulcanizing molded without causing disorder of the arrangement of the short fibers.

In the regular vulcanization which follows the preliminary molding, the belt material which is in a semi-vulcanized state, with the cog pitch, height of cog peaks, etc. nearly molded, is moved to the central part of the metallic mold where the regular cog shape is molded. Therefore, the arrangement of and tension cords is not disturbed and the stability of the belt thickness and cog shape can be realized.

As the present invention can be embodied in various forms without departing from the substantial characteristics, the above embodiment has been given solely for explanation perposes and is not of restrictive nature.

What is claimed is:

1. A mold for molding a cogged belt, comprising:
a substantially flat lower mold having a gentle curve in a lengthwise direction thereof; and
an upper mold having a cogged surface with cog peaks and cog troughs alternating with each other, said cogged surface comprising a pair of end portions and a central portion therebetween, wherein said cog peaks of said end portions are narrower than said cog peaks of said central portion but have the same height as said cog peak of said central portion.

2. The mold of claim 1, wherein:
said cog peaks of said end portions of said upper mold are 20–30% narrower than said cog peaks of said central portion.

3. The mold of claim 1, wherein:
said cog peaks of said end portions of said upper mold are are 0.2–0.5 mm narrower than said cog peaks of said central portion.

4. The mold of claim 1, wherein said upper mold has a cooling means for cooling an unvulcanized portion of the belt during the vulcanizing process.

5. The mold of claim 4, wherein said upper mold has heat insulating material embedded therein adjacent said end portions, said heat insulating material being located closer to said central portion than said cooling means.

6. The mold of claim 5, wherein said end portions are separated from said central portion by said heat insulating materials, and wherein said narrower cog peaks of said end portions extend over a specified range defined by end faces of said upper mold and said heat insulating materials.

7. The mold of claim 5, wherein said lower mold comprises:
- a further cooling means for cooling an unvulcanized portion of the belt during the vulcanizing process corresponding in position to said cooling means of said upper mold; and
- heat insulating material embedded therein corresponding in position to said heat insulating material of said upper mold.

8. A mold for molding a cogged belt, comprising:
- a substantially flat lower mold having a gentle curve in a lengthwise direction thereof; and
- an upper mold having a cogged surface with cog peaks and cog troughs alternating with each other, said cogged surfaces comprising an end portion and a central portion, wherein said cog peaks of said end portion are narrower than said cog peaks of said central portion but have the same height as said cog peaks of said central portion.

9. The mold of claim 8, wherein: said cog peaks of said end portion of said upper mold are 20-30% narrower than said cog peaks of said central portion.

10. The mold of claim 8, wherein: said cog peaks of said end portion of said upper mold are are 0.2-0.5 mm narrower than said cog peaks of said central portion.

11. The mold of claim 8, wherein said upper mold has a cooling means for cooling an unvulcanized portion of the belt during the vulcanizing process.

12. The mold of claim 11, wherein said upper mold has heat insulating material embedded therein adjacent said end portions, said heat insulating material being located closer to said central portion than said cooling means.

13. The mold of claim 12, wherein said end portion is separated from said central portion by said heat insulating material, wherein said narrower cog peaks of said end portion extends over a specified range defined by an end face of said upper mold and said heat insulating material.

14. The mold of claim 12, wherein said lower mold comprises:
- a further cooling means for cooling an unvulcanized portion of the belt during the vulcanizing process corresponding in position to said cooling means of said upper mold; and
- heat insulating material embedded therein corresponding in position to said heat insulating material of said upper mold.

* * * * *